US007722084B2

(12) United States Patent
Kobayashi

(10) Patent No.: US 7,722,084 B2
(45) Date of Patent: May 25, 2010

(54) DELIVERY SLIP

(75) Inventor: Kenji Kobayashi, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/211,487

(22) Filed: Sep. 16, 2008

(65) Prior Publication Data

US 2009/0085345 A1 Apr. 2, 2009

(30) Foreign Application Priority Data

Sep. 27, 2007 (JP) ............................. 2007-250929

(51) Int. Cl.
*B42D 15/00* (2006.01)
*G09C 3/00* (2006.01)

(52) U.S. Cl. ............................. 283/81; 283/67; 283/79; 283/80; 283/100; 283/101; 283/106

(58) Field of Classification Search ................... 283/79, 283/80, 81; 462/26, 27, 29, 31, 32, 33, 38, 462/46; *G06K 19/06; G09F 3/02*
See application file for complete search history.

(56) References Cited

U.S. PATENT DOCUMENTS 5,984,778 A * 11/1999 Murphy ........................ 462/22
6,213,518 B1 * 4/2001 Raming ........................ 283/67

FOREIGN PATENT DOCUMENTS

JP 2002-67546 A 3/2002

* cited by examiner

*Primary Examiner*—Dana Ross
*Assistant Examiner*—Justin V Lewis
(74) *Attorney, Agent, or Firm*—Westerman, Hattori, Daniels & Adrian, LLP

(57) ABSTRACT

A delivery slip 10 includes a first sheet 11 having a first sheet base 11A, both surfaces of which are provided with print letters P1; and a second sheet 12, which is provided separately from the first sheet 11, and, one surface of a second sheet base 12A is provided with an adhesive layer 12B, while the other surface is provided with print letters P2. The first sheet 11, being in a folded state, is temporarily stuck to the second sheet 12 through a releasable treatment layer 11B, and is to be held between the second sheet 12 and an adherend W by attaching the adhesive layer 12B, which is exposed outside of the first sheet 11, to the adherend W.

12 Claims, 3 Drawing Sheets

DELIVERY SLIP

BACKGROUND OF THE INVENTION

1. Field of the Invention

The present invention relates to a delivery slip, and more particularly to a delivery slip capable of maintaining information necessary to be secret concerning a product via home-delivery in a concealed state, and also capable of responding to even when the information volume increases.

2. Description of the Related Art

Recently, with the universal spread of Internet shopping, TV shopping, and the like, mail-order sales have become popular in addition to traditional over-the-counter sales, and a distribution system by delivery companies to deliver products to consumers on behalf of sellers has been increasingly common. Consequently, leaks of information about the products such as the product name and price may be caused through the delivery slips. These information identify the products bought by the consumers, therefore such information are confidential information greatly concerning privacy of the consumers. Also from the perspective of discouraging theft during the course of distribution, they should be confidential information because the product value can be figured out from the product price.

As a delivery slip described above, an example is disclosed in the patent document 1. The delivery slip includes a duplicate attachment label which is positioned on the front surface of an adherend when attaching thereto; a receipt and a delivered label portions which are provided side by side with the duplicate attachment label; and an original attachment label; being arranged that an adhesive layer provided to the original attachment label and adhesive layers provided to the outer sides of the duplicate attachment label are to be attached to the adherend in a state where the original attachment label is folded and positioned on the back surface side of the duplicate attachment label.

Patent Document 1: Japanese Patent Application Laid-Open No. 2002-67546

SUMMARY OF THE INVENTION

However, in the delivery slip disclosed in the patent document 1, because one surface of the original attachment label is provided with the adhesive layer, a printing area of the original attachment label is only one side surface. Accordingly, there is such a disadvantage that it has a certain limit a really even when intending to increase information volume to be printed on the receipt and the delivered label portions and the original attachment label. Then, although it is possible to respond to it by increasing attachment labels in theory, the whole size of the delivery slip, print letters arrangement, layout, and the like, have to be changed in this case, and that causes another disadvantage that design change on too many portions is obliged to be executed.

The present invention has been made in view of the above disadvantages, and its object is to provide a delivery slip which is not required to execute a major design change even when information volume to be printed increases.

In order to achieve the above object, the present invention adopts such an arrangement that includes: a first sheet, both surfaces of which are printed with confidential information including information concerning a product via home-delivery; and a second sheet, which is provided separately from the first sheet, and one surface of which is provided with an adhesive layer, while the other surface is printed with delivery information; wherein, when the first sheet is folded and overlapped with the adhesive layer of the second sheet, the adhesive layer can be exposed outside of the first sheet; and when the second sheet is attached to an adherend, the first sheet is held between the second sheet and the adherend, and is formed to be releasable from the second sheet.

In the present invention, such an arrangement may be adopted that an edge portion of the first sheet is maintained to be protruded out of an edge portion of the second sheet in size or in relative position.

Also, it is preferable to adopt such an arrangement that a perforated-line is formed on the second sheet along the periphery of the first sheet which is in the folded state.

Further, such an arrangement is adopted that a releasable treatment layer is provided on a portion in the first sheet which is to be a mating surface with the second sheet.

Furthermore, such an arrangement may be adopted that a receipt being releasable from the second sheet is temporarily stuck on the second sheet.

Additionally, in the present invention, "print letters" is used as a concept including characters, symbols, graphics, or their optional combinations.

According to the present invention, because the first sheet, both surfaces of which are capable of being printed with the confidential information is held between the second sheet and the adherend in a folded state, a printing area of the first sheet can be secured sufficiently. And, even when the first sheet is changed in design, the second sheet is not required to be changed, and even in the reverse case, the other sheet can be used as it is, thereby allowing for response to changes in the information volume easily. Also, because the first sheet is formed to be releasable from the second sheet, suitability for filing can be given to the first sheet.

Further, the first sheet is maintained to be protruded out of the second sheet, a recipient of a product via home-delivery can be easily aware of the existence of the first sheet.

Furthermore, according to the arrangement that the perforated-line is formed on the second sheet, it can be cut out in a stripping-off manner by picking a first sheet portion which is protruded out of the second sheet.

Still further, owing to such an arrangement that the first sheet being in a folded state is provided with the releasable treatment layer on the mating surface with the second sheet, the first sheet can be peeled off tidily from the second sheet to be filed.

Yet still further, according to such an arrangement that the releasable receipt is temporarily stuck on the second sheet, a delivery person can bring back only the receipt without peeling off the second sheet from the adherend.

DETAILED DESCRIPTION OF THE PREFERRED EMBODIMENT

Hereinafter, an embodiment of the present invention will be described with reference to the accompanying drawings.

Figure 1:
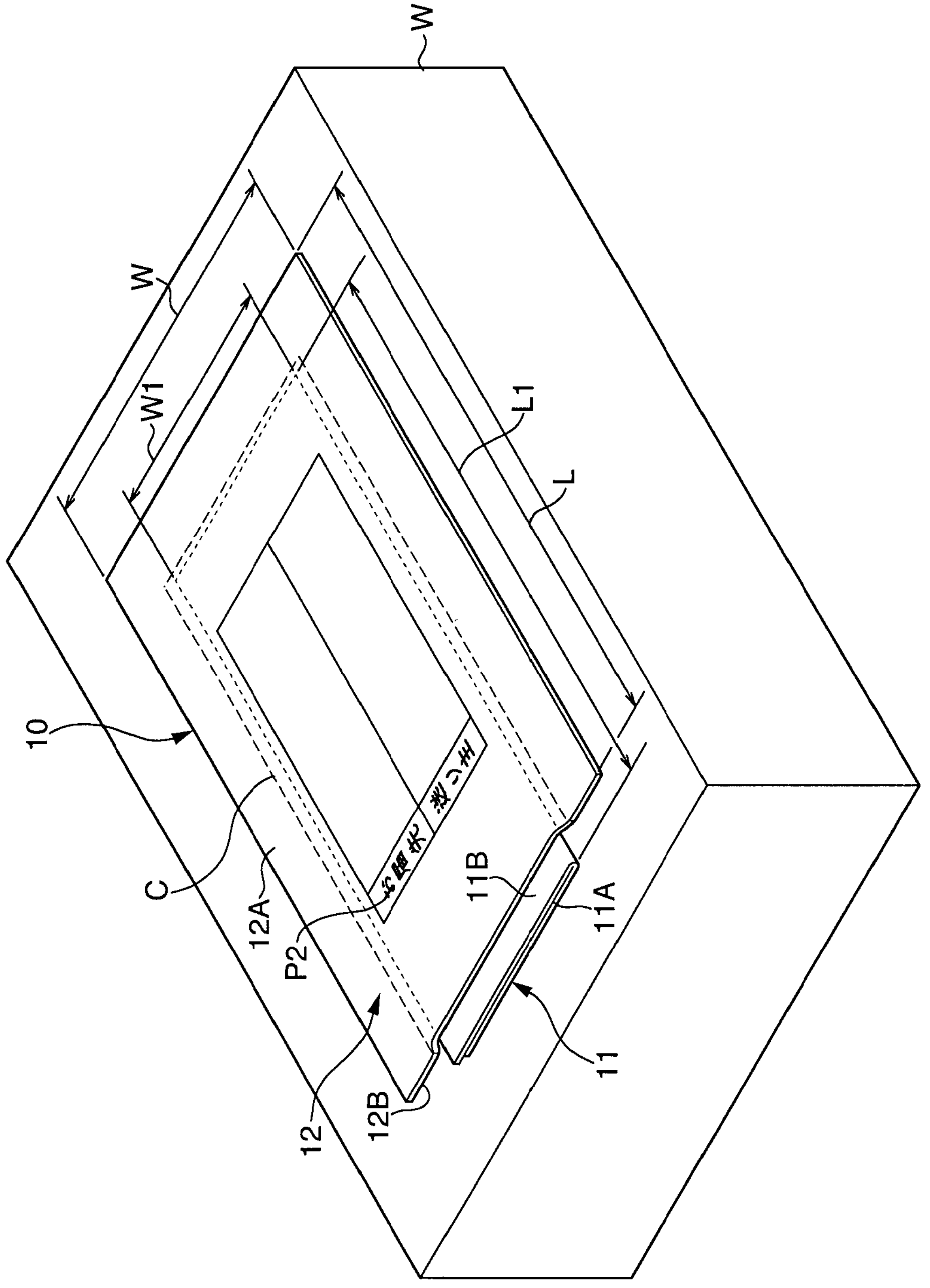
FIG. 1 is a perspective view schematically showing a usage state of a delivery slip according to the embodiment.
Figure 2:
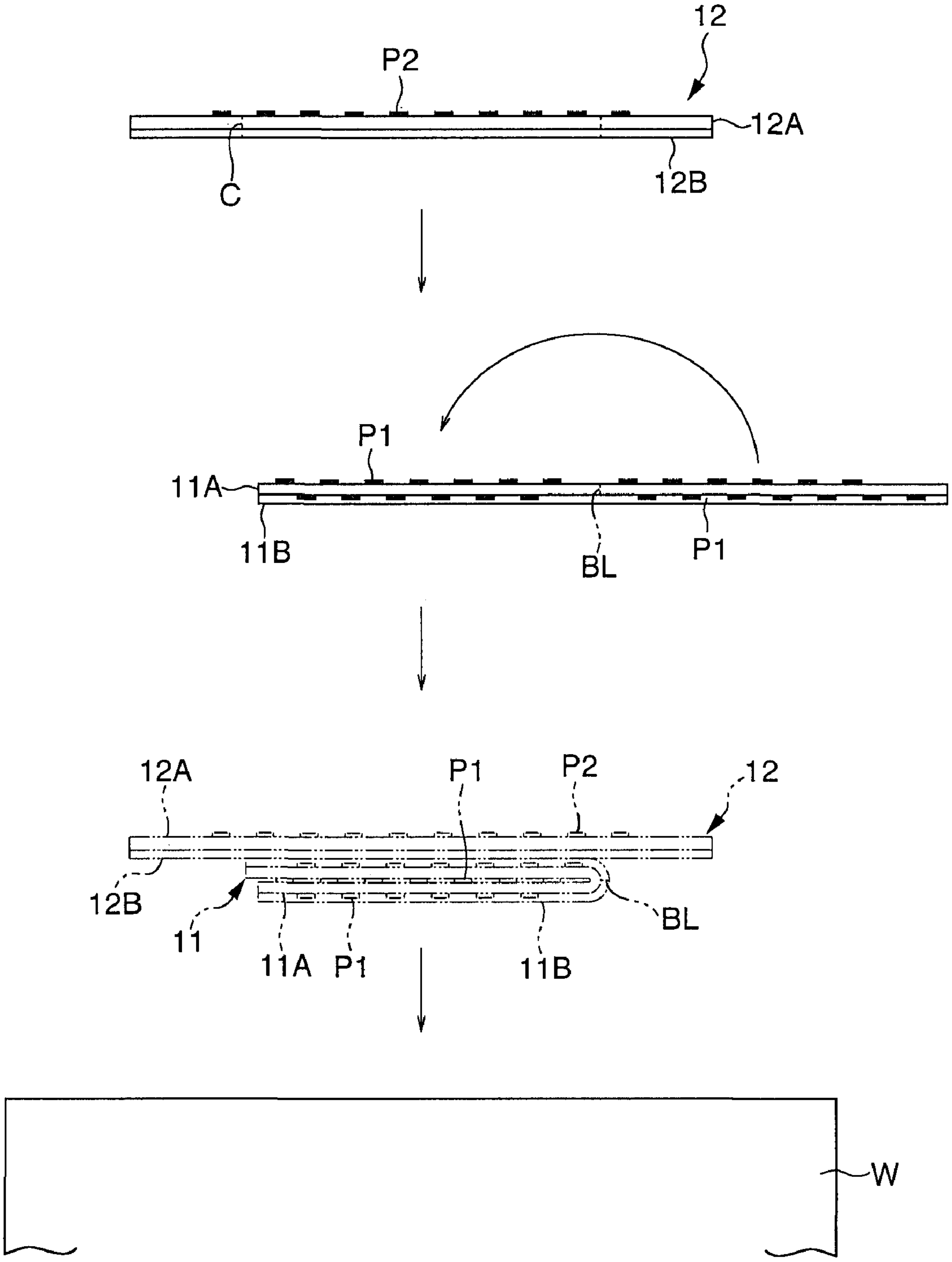
FIG. 2 is an exploded side view of FIG. 1.

FIG. 1 shows a schematic perspective view of a delivery slip according to the embodiment in which the delivery slip is attached to a package of a product via home-delivery as an adherend, and FIG. 2 shows an exploded side view thereof. In these drawings, a delivery slip 10 includes a first sheet 11, and a second sheet 12 which is capable of sticking to an adherend W so as to hold the first sheet 11 between the second sheet 12 and the adherend W.

The first sheet 11 includes a first sheet base 11A, and a releasable treatment layer 11B which is provided on one surface side thereof (lower surface in FIG. 2). In the embodiment, the first sheet 11 is used, as shown in FIG. 2, in a state of being folded into two along a folding line BL. And, the respective surfaces of the first sheet base 11A are printed with print letters P1 relevant to confidential information such as a product name, a price, and a receipt of the product via home-delivery. In this regard, the print letters P1 within an area where the releasable treatment layer 11B is to be provided are printed in a step before laminating the releasable treatment layer 11B, therefore, formulaic contents such as a description about cooling-off, campaign information, an advertising literature, a commercial message or the like, are printed.

The second sheet 12 is provided separately from the first sheet 11. The second sheet 12 includes a second sheet base 12A having a substantially rectangular plane shape, and an adhesive layer 12B which is provided on one surface (lower surface) of the second sheet base 12A, while the other surface (upper surface) of the second sheet base 12A is printed with print letters P2 relevant to delivery information such as a destination and a sender of the product via home-delivery.

Also, as for the second sheet 12, a perforated-line C extended along a substantially U-shaped track in plane view is formed thereon so that the open side of the U-shape is to be positioned at one edge side of the first sheet 11 in the longitudinal direction. Further, a length L and a width W of the second sheet 12 are respectively set to be larger than a length L1 and a width W1 when the first sheet 11 is folded. Therefore, when the first sheet 11 is folded and overlapped with the adhesive layer 12B of the second sheet 12, the first sheet 11 is positioned within the perforated-line C, and the adhesive layer 12B which is outside of the perforated-line C is exposed outside of the periphery of the first sheet 11.

In this regard, the folding line BL on the first sheet 11 is provided slightly off the center of the first sheet 11 to the left in the horizontal direction in FIG. 2. Accordingly, when the first sheet 11 is folded into two at the folding line BL, the first sheet base 11 is allowed to be effectively prevented from being disabled to be peeled off from the second sheet 12 due to improperly sticking of the first sheet base 11A, which is not provided with the releasable treatment, to the adhesive layer 12B.

Next, usage of the delivery slip 10 in accordance with the embodiment will be described.

As shown in FIG. 2, the first sheet 11 is folded into two at the folding line BL, and the upper surface side thereof is formed as the mating surface to be temporarily stuck to the adhesive layer 12B of the second sheet 12. The temporary sticking is performed in the position where the first sheet 11 folded into two is positioned within the perforated-line C, and is relatively positioned so that one edge portion of the first sheet 11 is to be a predetermined amount protruded out of the open side of the U-shape of the perforated-line C.

Next, by sticking the outside of the periphery of the first sheet 11, that is, the adhesive layer 12B which is exposed outside of the perforated-line C, to the adherend W, the first sheet 11 is held in a sandwiched state between the second sheet 12 and the adherend W.

In this regard, a recipient of the product via home-delivery picks the protruded portion of the first sheet 11 and pulls it up, thereby allowing to take out the first sheet 11 along the perforated-line C on the second sheet 12, and then allowing to file only the first sheet 11 by releasing it from the second sheet 12.

Therefore, according to the embodiment as described above, both sides of the first sheet 11 can be used as print surfaces, thereby allowing for response to increase in print information sufficiently without having to enlarge the plane area of the delivery slip 10. Also, because the adhesive layer 12B of the second sheet 12 is provided on the whole area of one surface of the second sheet base 12A, that can hold the first sheet 11 between the second sheet 12 and the adherend W in a state that is temporarily stuck to the mating surface in the first sheet 11, thus, such a disadvantage that the first sheet 11 drops off caused by slipping out in the horizontal direction does not occur.

The best arrangement, method and the like for carrying out the present invention have been disclosed so far. However, the present invention is not limited to the above.

That is, the present invention has been illustrated and described mainly about a specific embodiment. However, it is possible for those skilled in the art to add various modifications, if necessary, to the above-described embodiment with respect to the shape, position and/or disposition without departing from the technical spirit and the range of the object of the present invention.

Figure 3:
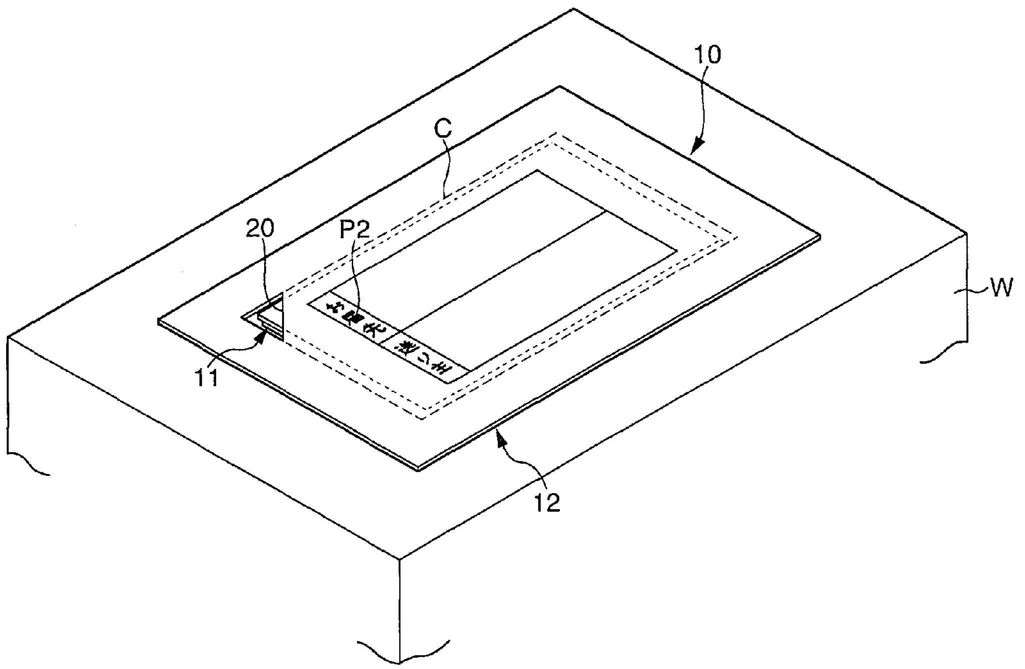
FIG. 3 is a perspective view schematically showing an alternative example of the present invention.

For example, in the above embodiment, a case where the first sheet 11 is held between the second sheet 12 and the adherend W in a state that is protruding out of one edge of the second sheet 12 has been illustrated and described. However, the present invention is not limited to the above. An arrangement shown in FIG. 3 also may be applicable. In the arrangement, the perforated-line C is formed in a closed loop-shape within the surface of the second sheet 12, and a cutout portion 20 is formed at the corner portion of the perforated-line C, so that a part of the first sheet 11 is exposed in the cutout portion 20.

In such an arrangement, the first sheet 11 can be taken out by inserting a fingertip into the cutout portion 20 and picking the corner part of the first sheet 11, and then cutting out in a stripping-off manner along the perforated-line C.

Figure 4:
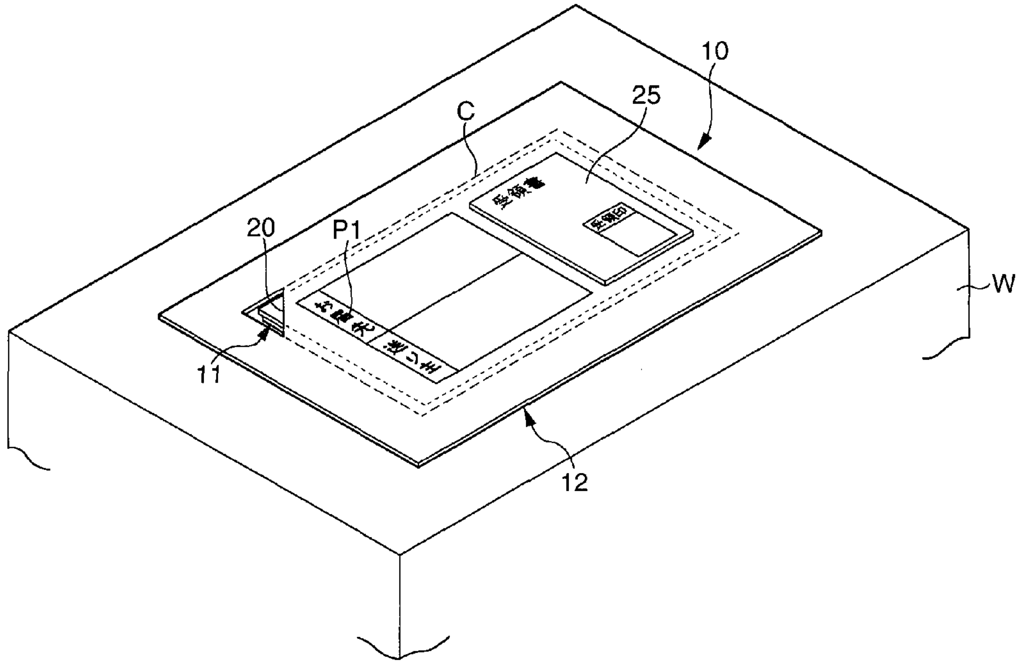
FIG. 4 is a perspective view schematically showing another alternative example of the present invention.

And, as shown in FIG. 4, a sheet-like receipt 25 provided with an area to be stamped with a receipt stamp by a recipient may be temporarily stuck on the surface of the second sheet 12 in a releasable state. In so doing, the receipt 25 can be peeled off easily by attaching to the second sheet 12 through a pseudo-adhesive layer (not shown). In this regard, the pseudo-adhesive layer can be arranged in a layered structure having two layers, and known materials which are releasable at their interface may be used. As for the materials to form the respective layers, polyethylene resin, polystyrene resin, acrylic resin, natural rubber-base resin, vinyl chloride-vinyl acetate copolymer, ethylene-vinyl acetate copolymer, UV-curable varnish, polyethylene terephthalate resin, and the like may be exemplified, and they may be optionally combined among different types of materials to form the pseudo-adhesive layer.

Also, in the above embodiment, a case where the first sheet 11 is folded into two has been described. However, it may be folded into three or more. As described above, even when the information volume to be put in the first sheet 11 increases, only the first sheet 11 is to be changed in size without having to change the second sheet 12, thereby allowing for response to changes in the information volume easily. Additionally, even in the above case, it is preferable that the surface in the first sheet 11 to be mating with the second sheet 12 is formed as the surface provided with the releasable treatment, and also is provided with the folding lines BL so as to be larger than the other surfaces.

Further, the length in the L1 direction of the mating surface in the first sheet 11 may be set as longer than lengths of the other surfaces. By this manner, a risk that the first sheet base 11A, which is not provided with the releasable treatment, sticks to the adhesive layer 12B can be eliminated.

Furthermore, the releasable treatment layer 11B is not required to be provided on the whole area of one surface side of the first sheet base 11A which forms the first sheet 11. That is, the releasable treatment layer may be provided only on the area in the first sheet 11 to be the mating surface with the adhesive layer 12B of the second sheet 12A when the first sheet 11 is folded. By such an arrangement, flexibility can be given to the responses when the confidential information are variable information.

What is claimed is:

1. A delivery slip, comprising:

a first sheet, both surfaces of which are printed upon; and a second sheet, a back surface of which is provided with an adhesive layer, and a front surface of which is printed upon;

wherein the first sheet is folded and overlapped with the second sheet, and the adhesive layer of the said second sheet is exposed in an area outside of the folded first sheet; and wherein the second sheet is attached to an adherend, the first sheet is held between the second sheet and the adherend, and the first sheet is releasable from the second sheet.

2. The delivery slip according to claim 1, wherein the delivery slip is configurable such that an edge portion of the folded first sheet protrudes from an edge portion of the second sheet.

3. The delivery slip according to claim 1 or claim 2, wherein a U-shaped perforated-line is formed on the second sheet along the periphery of the folded first sheet.

4. The delivery slip according to claim 1 or claim 2, further comprising a releasable treatment layer on a portion of the folded first sheet which is a mating surface with the second sheet.

5. The delivery slip according to claim 1 or claim 2, further comprising a receipt temporarily stuck on the second sheet, the receipt being releasable from the second sheet.

6. The delivery slip according to claim 1 or claim 2, wherein the folded first sheet is the result of the first sheet being folded in half or in thirds.

7. The delivery slip according to claim 1, further comprising a cut-out portion formed in said second sheet, said folded first sheet being exposed through said cut-out portion.

8. The delivery slip according to claim 7, further comprising a receipt temporarily stuck on the second sheet, the receipt being releasable from the second sheet.

9. The delivery slip of claim 1, wherein the area of said second sheet is greater than the area of the folded first sheet.

10. The delivery slip according to claim 9, wherein the folded first sheet is the result of the first sheet being folded in half or in thirds.

11. The delivery slip according to claim 1, wherein a rectangular-shaped perforated-line is formed on the second sheet along the periphery of the folded first sheet.

12. The delivery slip according to claim 1, wherein the adhesive layer is formed on the entirety of the back surface of the second sheet.

* * * * *